United States Patent
Zhang et al.

(10) Patent No.: US 9,964,225 B2
(45) Date of Patent: May 8, 2018

(54) WATER INLET VALVE FEATURING STAIN RESISTANCE, EASY CLEANING, AND QUICK DISASSEMBLY

(71) Applicant: COMPAS (XIAMEN) PLUMBING TECHNOLOGY CO., LTD., Xiamen (CN)

(72) Inventors: Yanjun Zhang, Xiamen (CN); Shenglong Pan, Xiamen (CN)

(73) Assignee: COMPAS (XIAMEN) PLUMBING TECHNOLOGY CO., LTD., Xiamen (CN)

(*) Notice: Subject to any disclaimer, the term of this patent is extended or adjusted under 35 U.S.C. 154(b) by 0 days. days.

(21) Appl. No.: 15/269,500

(22) Filed: Sep. 19, 2016

(65) Prior Publication Data
US 2017/0167623 A1    Jun. 15, 2017

(30) Foreign Application Priority Data
Dec. 10, 2015 (CN) .......................... 2015 1 0915181

(51) Int. Cl.
| F16K 27/06 | (2006.01) |
| B01D 29/11 | (2006.01) |
| F16K 5/08 | (2006.01) |
| F16K 31/24 | (2006.01) |

(52) U.S. Cl.
CPC ............ *F16K 27/06* (2013.01); *B01D 29/114* (2013.01); *F16K 5/08* (2013.01); *F16K 31/24* (2013.01); *B01D 2201/16* (2013.01)

(58) Field of Classification Search
CPC . F16K 27/06; F16K 5/08; F16K 31/24; B01D 29/114
See application file for complete search history.

(56) References Cited

U.S. PATENT DOCUMENTS

| 5,601,713 A * | 2/1997 | Mayeaux et al. .... B01D 17/045 210/426 |
| 2013/0008839 A1* | 1/2013 | Wilkendorf et al. .. B01D 35/06 210/90 |
| 2015/0136682 A1* | 5/2015 | Freidinger ............. B01D 35/12 210/340 |

* cited by examiner

*Primary Examiner* — Kevin Lee
(74) *Attorney, Agent, or Firm* — Rabin & Berdo, P.C.

(57) ABSTRACT

A water inlet valve providing stain resistance, easy cleaning, and quick disassembly includes an inlet passage having an insert opening disposed at an upper end of the water inlet valve; an inlet divider; a filter component connected to the inlet divider to form a filtering dividing mechanism, and a water stop valve in communication with the water inlet valve that that controls the water inlet valve to stop water flow. The filter component and the inlet divider are disposed between the inlet passage an outlet of the inlet valve, water flowing through the inlet passage is filtered and is divided into two waterways by the inlet divider including a main waterway that flows to the outlet for inletting and a subwaterway that flows to the water stop valve, and the filtering dividing mechanism is inserted into the inlet passage through the insert opening and is disassembled from the insert opening.

10 Claims, 8 Drawing Sheets

WATER INLET VALVE FEATURING STAIN RESISTANCE, EASY CLEANING, AND QUICK DISASSEMBLY

FIELD OF THE INVENTION

The present invention relates to an inlet valve, especially to a stain resistance and easy cleaning quick-disassemble inlet valve.

BACKGROUND OF THE INVENTION

Traditional inlet valve, as figured in FIG. 1, is applied with Pascal's Principle (backpressure type), the water stop padding is disposed with a through hole 200, the through hole 200 is coupled to the valve spool 201 of the valve cover (the valve spool 210 can be independent), the valve spool 201 is disposed with a thin groove 202. The disadvantages are that: if the water quality is bad, the groove 202 is easily blocked by the dirt in the water, it makes it unable to form backpressure to the water stop padding, thus making the inlet valve unable to stop water. Besides, when to wash the valve spool 201, it needs professional person to disassemble, it is difficult for ordinary to operate.

SUMMARY OF THE INVENTION

The object of the present invention is to overcome the disadvantages of the existing technology and to provide with a stain resistance and easy cleaning quick-disassemble inlet valve that the water stop padding is not easily invalid.

The technical proposal of the present invention is that:

A stain resistance and easy cleaning quick-disassemble inlet valve, wherein a filter component, an inlet divider are disposed between the inlet passage of the inlet valve and the outlet, water of the inlet passage is filtered when flowing through the filter component and divided into two ways by the inlet divider; water of the main waterway flows to the outlet for inletting; water of the sub waterway flows to the water stop valve to control the inlet valve to stop water; the filter component is connected to the inlet divider to form a filtering dividing mechanism, the inlet valve is disposed with an insert opening at the upper end corresponding to the inlet passage, the filtering dividing mechanism is inserted to the inlet passage through the insert opening and is disassembled from the insert opening.

In another preferred embodiment, the water stop valve comprises a water stop padding and a valve cover, the water stop padding covers on the valve cover in sealing way to form a water chamber with the valve cover; the valve cover is disposed with an inlet groove and a decompression hole, the inlet groove is connected to the water chamber, the decompression hole is disposed on the bottom surface of the valve cover, the water chamber is connected to the outer world by the decompression hole, the water of the sub waterway flows to the water chamber from the inlet groove and flows out of the decompression hole.

In another preferred embodiment, the float of the inlet valve is connected to the plug by a link mechanism, when water rises to the preset height, the float drives the plug to close the decompression hole, the water pressure in the water chamber pushes the water stop padding to close the outlet.

In another preferred embodiment, the inlet divider is disposed with a filter screen at the initial position of the sub waterway, water of the sub waterway is filtered by the filter screen and flows to the water stop valve.

In another preferred embodiment, the filter component is totally covering the inlet of the inlet passage.

In another preferred embodiment, the filter component is a column shaped spiral filter screen, the spiral filter screen is inserted to the inlet end of the inlet divider.

In another preferred embodiment, the top portion of the inlet divider is disposed with a lock block, when disassembling, a disassembly component is locked to the lock block, the disassembly component is pulled to drive the filtering dividing mechanism to separate from the inlet passage of the inlet valve.

In another preferred embodiment, the end portion of the disassembly component is a lock groove coupled to the lock block, the lock groove is locked to the lock block to achieve the connecting of the disassembly component and the inlet divider.

In another preferred embodiment, the disassembly component is a wrench with a lock groove, the lock groove is a reducing groove, the end portion of the lock block is an expanding head, when connecting, the expanding head is inserted from the end face of the reducing groove to abut against the reducing groove.

In another preferred embodiment, the upper position of the insert opening is disposed with an insert groove with one end opening, the disassembly component slides from the opening of the insert groove to be embedded to the insert groove, the insert opening is covered to prevent the filtering dividing mechanism from separating from the insert opening.

The present invention has advantages as follows:

The inlet valve of the present invention is disposed with a filtering dividing mechanism of quick assembly and disassembly, water flowing to the inlet passage is filtered completely by the filter component and is divided by the inlet divider. Therein, water flowing to the sub waterway of the water stop valve can be preferred filtered again to make sure that water flowing to the water stop valve is cleaner, thus preventing the invalid of the water stop valve. Besides, the water stop padding of the present invention is disposed without a valve spool hole coupled to the valve spool, so that the water quality doesn't influence the water stop padding, water flows to the water stop valve by the inlet groove, backpressure generated by the cooperation of the sealing of the decompression hole, the water stop valve can be served long without dirt depositing.

When the inlet valve is blocked by foreign body, water can not flow to the inlet valve, it doesn't need to disassemble the water pipe. It can only use a disassembly component to get the filtering dividing mechanism from the top portion of the inlet valve to wash. When water can not be stopped by the water stop valve, at the same way, the filtering dividing mechanism can be quickly separated, the inlet divider is disassembled from the filter component, the filter screen is disassembled to wash. The disassembly component is assembled to the inlet valve that it is convenient for acceptation, also being a sealing element, the disassembly component can position the filtering dividing mechanism.

Figure 1:
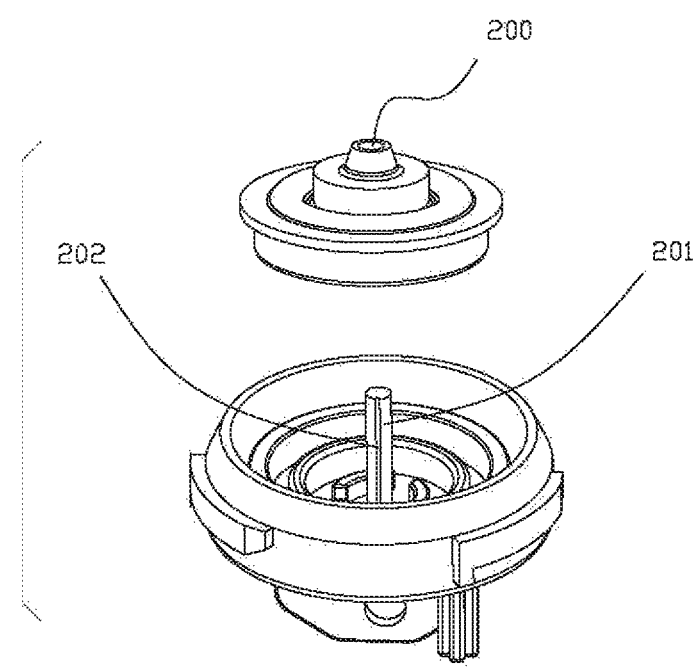
FIG. 1 illustrates an exploded and schematic diagram of the water stop valve of the existing technology.

REFERENCE SIGNS inlet valve 100, inlet passage 101, inlet 1011, insert opening 102, float 103, link mechanism 104, plug 105, insert groove 106, filtering dividing mechanism 110, filter component 111, inlet divider 112, main waterway 1121, sub waterway 1122, lock block 1123, expanding head 1124, filter screen 113, water stop valve 120, water stop padding 121, valve cover 122, water chamber 123, inlet groove 124, decompression hole 125, disassembly component 130, lock groove 131, through hole 200, valve spool 201, groove 202.

DETAILED DESCRIPTION OF THE EMBODIMENTS

The present invention will be further described with the drawings and the embodiments.

Figure 2:
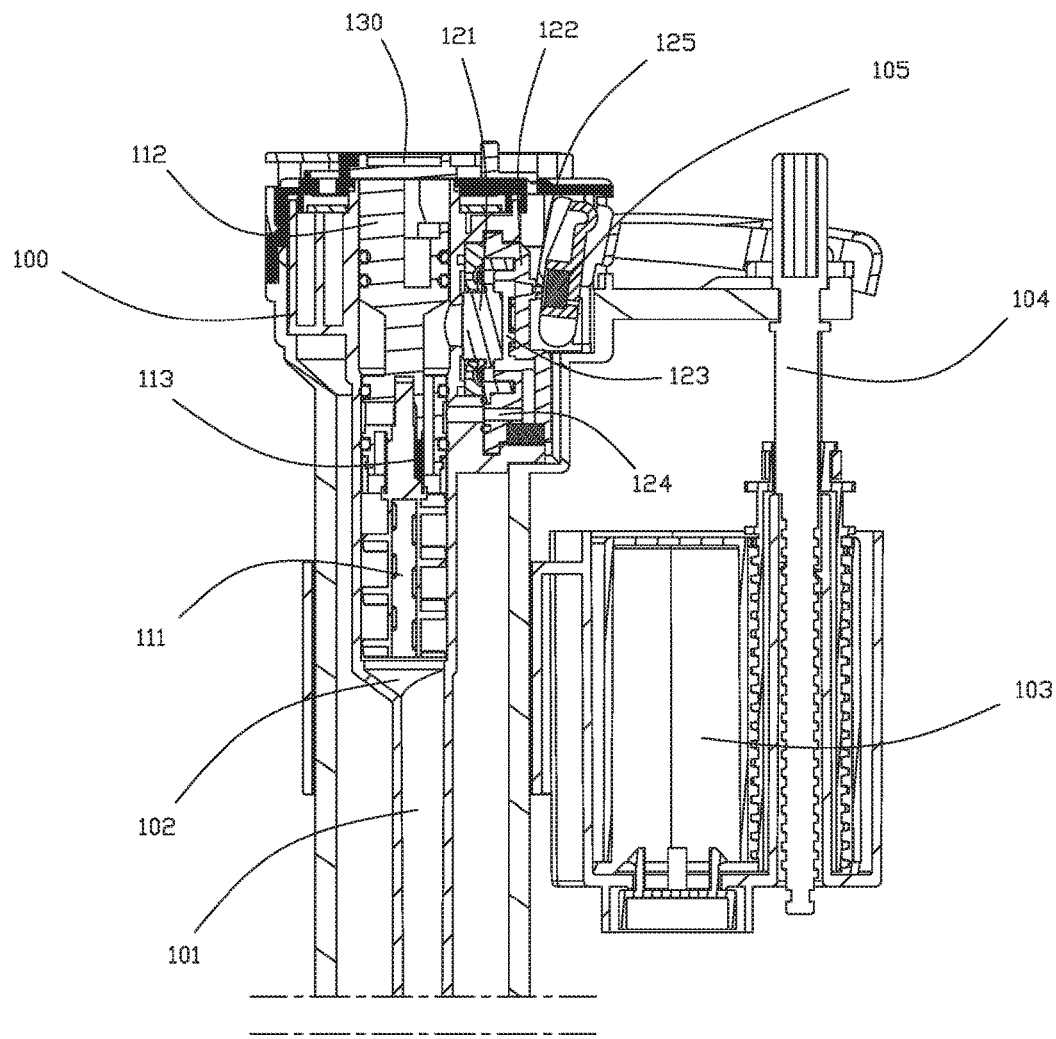
FIG. 2 illustrates a sectional diagram of the inlet valve of the present invention without the pipe body at the lower portion of the inlet valve.
Figure 3:
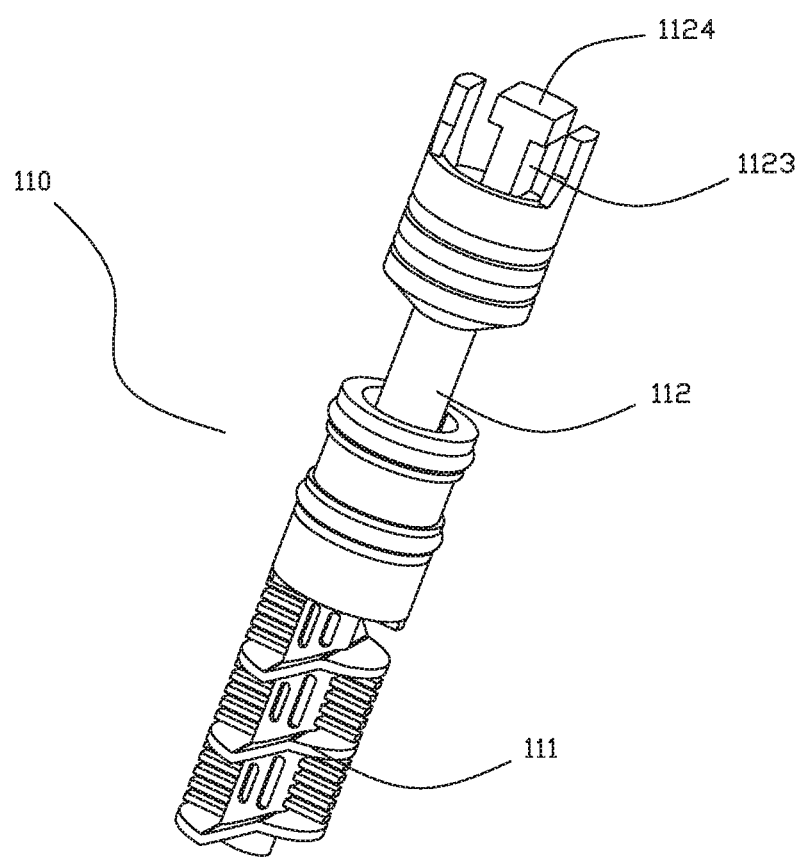
FIG. 3 illustrates a schematic diagram of the filtering dividing mechanism of the present invention.
Figure 4:
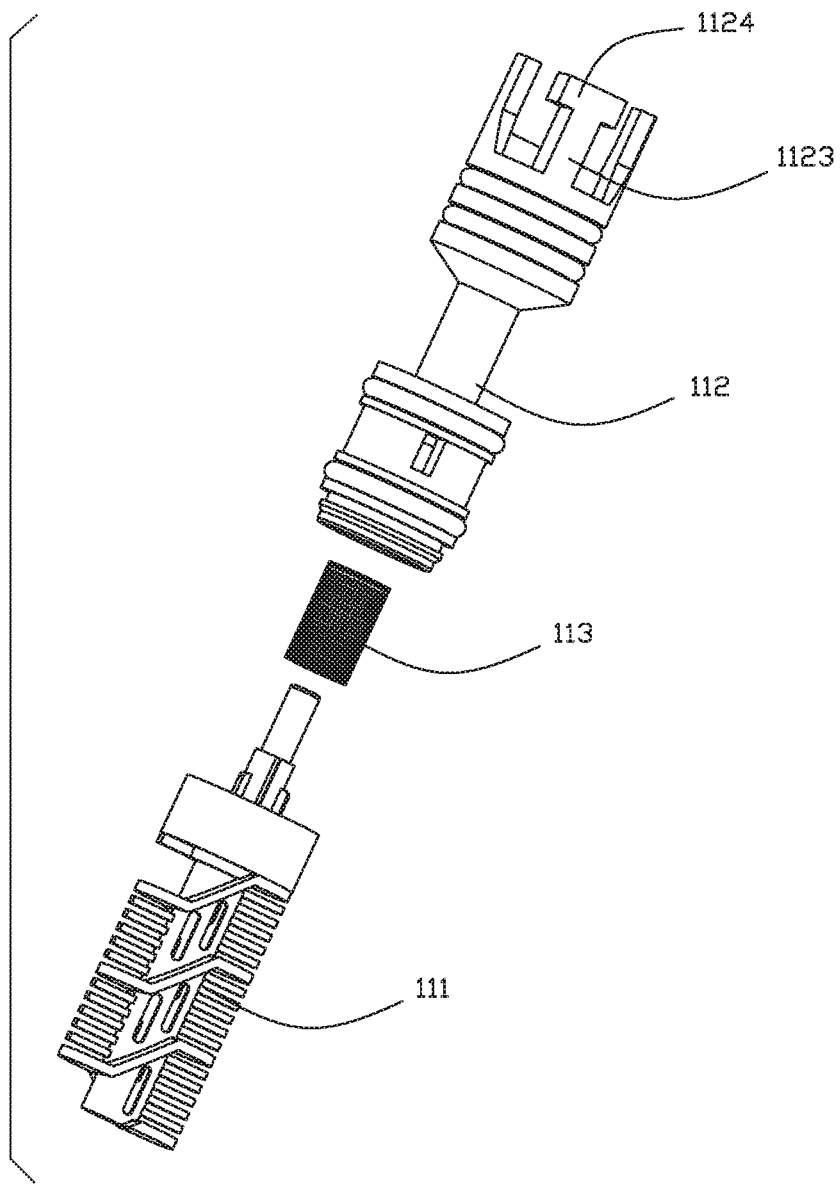
FIG. 4 illustrates an exploded and schematic diagram of the filtering dividing mechanism of the present invention.
Figure 5:
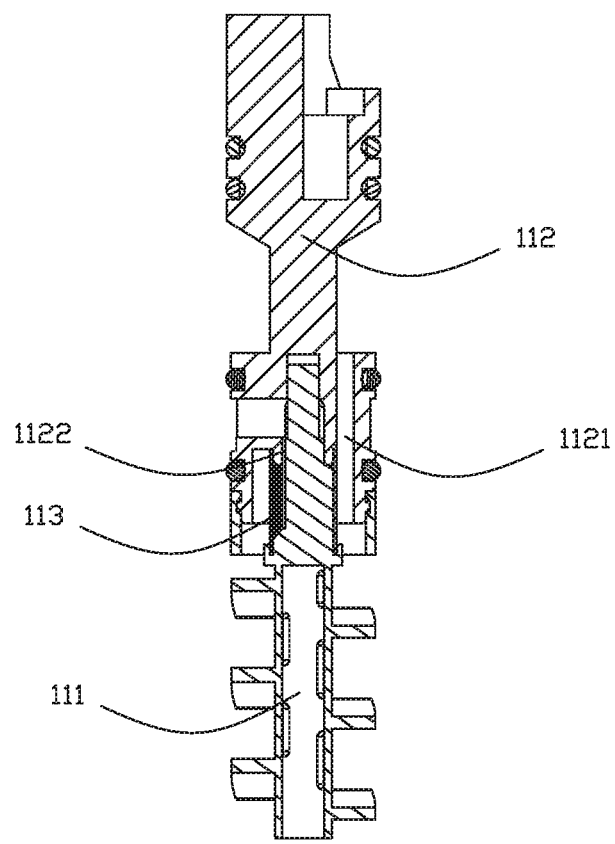
FIG. 5 illustrates a sectional diagram of the filtering dividing mechanism of the present invention.

To solve the problems of water stop valve of the existing technology that the water stop is influenced by the water quality and it is easily blocked by dirt that it may cause the water stop unable to stop watery, the present invention is provided with a stain resistance and easy cleaning quick-disassemble inlet valve, as figured in FIG. 2, a filtering component 111 and an inlet divider 112 is disposed between the inlet passage 101 of the inlet valve 100 and the outlet, water flowing to the inlet passage 101 is filtered by the filtering component 111 and divided to two ways by the inlet divider 112; water of the main waterway 1121 flows to the outlet for inletting; water of the sub waterway 1122 flows to the water stop valve 120 to control the inlet valve 100 to stop water. As figured in FIG. 3, FIG. 4 and FIG. 5, the filter component 111 is connected to the inlet divider 112 to form a filtering dividing mechanism 110, the inlet valve 100 is disposed with an insert opening 102 at the upper end corresponding to the inlet passage 101, the filtering dividing mechanism 110 is inserted to the inlet passage 101 through the insert opening 102 and is disassembled from the insert opening 102 to realize the quick assembly and disassembly of the filtering dividing mechanism 110, it is convenient to disassemble to wash. The filtering component 111 filters the water flowing to the inlet passage 101 to remove the dirt in the waterway, so that the water flowing to the water stop valve 120 is cleaner that it is uneasy to cause dirt depositing the water stop valve 120.

To further ensure that the water flowing to the water stop valve 120 is cleaner, the inlet divider 112 is disposed with a filter screen 113 at the initial position of the sub waterway 1122, water of the sub waterway 1122 is filtered by the filter screen 113 and flows to the water stop valve 120.

It must be considered both that the filter component 111 needs to filter the inlet waterway completely and the filtering dividing mechanism can be quick assembled and disassembled, the filter component 111 totally covers the inlet 101 of the inlet passage 101. In this embodiment, the filter component 111 is a column shaped spiral filter screen 113, the spiral filter screen 113 is inserted to the inlet end of the inlet divider 112. water is filtered by the spiral filter screen 113 completely and then flows to the inlet divider 112.

Figure 6:
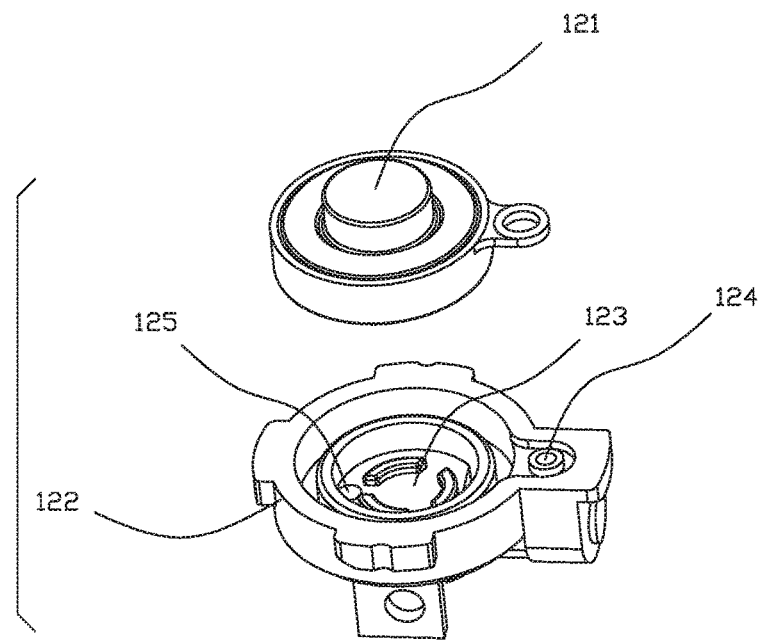
FIG. 6 illustrates an exploded and schematic diagram of the water stop valve of the present invention.
Figure 7:
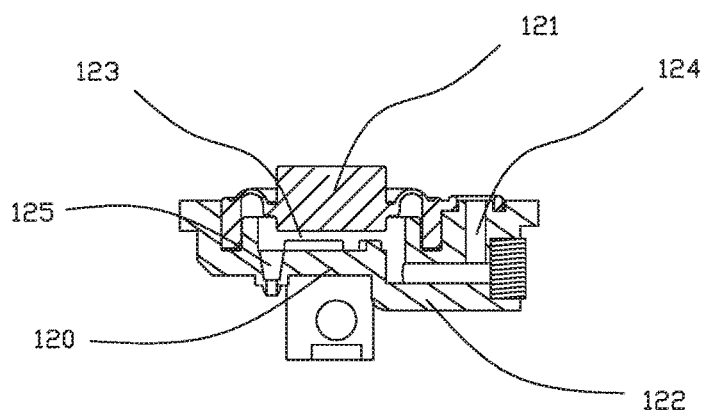
FIG. 7 illustrates a sectional diagram of the water stop valve of the present invention.

The present invention obviously changes the structure of the water stop valve 120 to achieve anti-block effect, as figured in FIG. 6 and FIG. 7, the water stop valve 120 comprises a water stop padding 121 and a valve cover 122, the water stop padding 121 covers on the valve cover 122 in sealing way to form a water chamber 123 with the valve cover 122; the valve cover 122 is disposed with an inlet groove 124 and a decompression hole 125, the inlet groove 124 is connected to the water chamber 123, the decompression hole 125 is disposed on the bottom surface of the valve cover 122, the water chamber 123 is connected to the outer world by the decompression hole 125, the water of the sub waterway 1122 flows to the water chamber 123 from the inlet groove 124 and flows out of the decompression hole 125.

In this embodiment, the blocking to the decompression hole 125 is indirectly controlled by the float 103, it finally achieves that the float 102 controls the inlet of the inlet valve 100. The float 103 of the inlet valve 100 is connected to the plug 105 by a link mechanism 104, when water rises to the preset height, the float 103 drives the plug 105 to close the decompression hole 125, the water pressure in the water chamber 123 pushes the water stop padding 121 to close the outlet.

Figure 8:
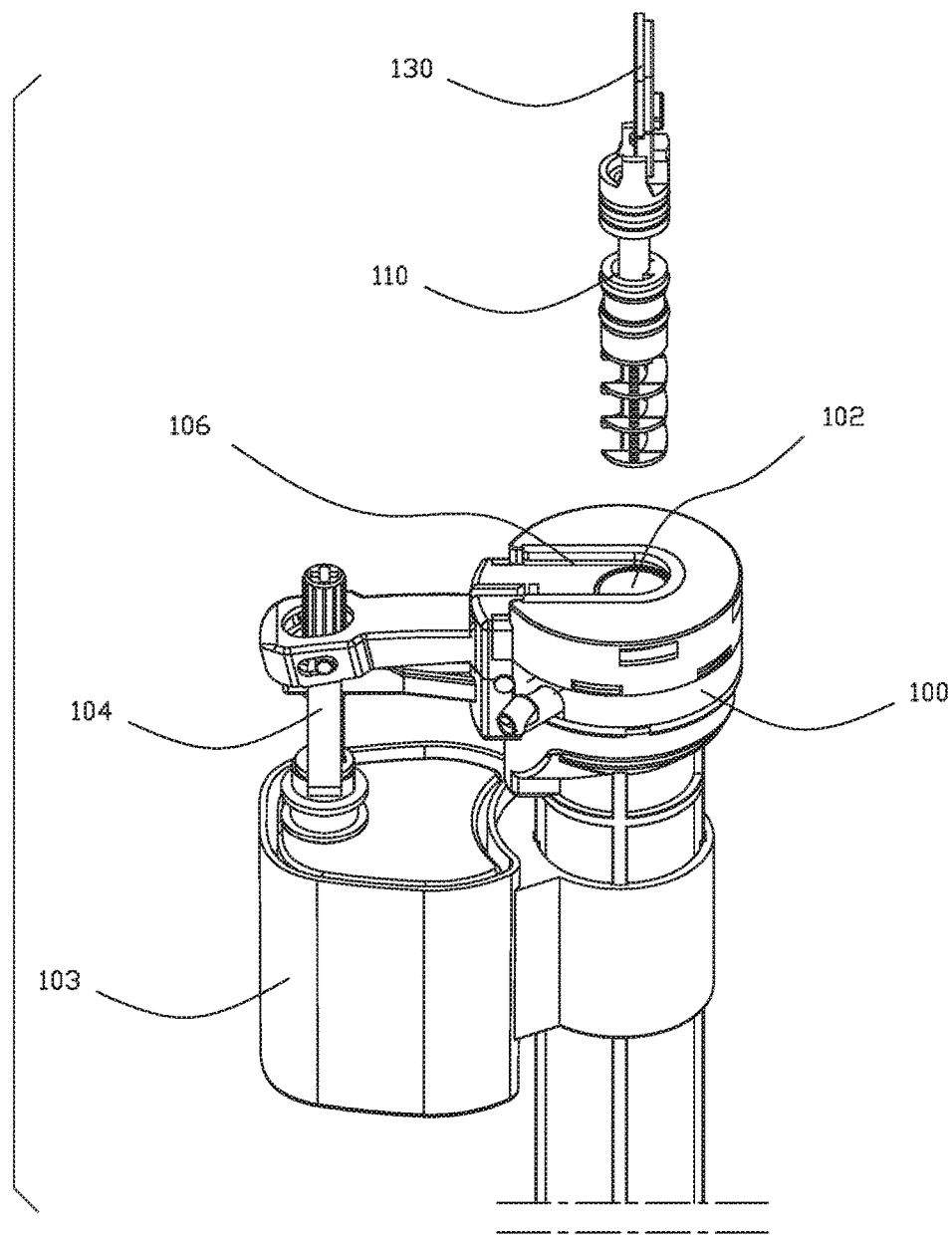
FIG. 8 illustrates a schematic diagram of the filtering dividing mechanism without the pipe body at the lower portion of the inlet valve when disassembling.
Figure 9:
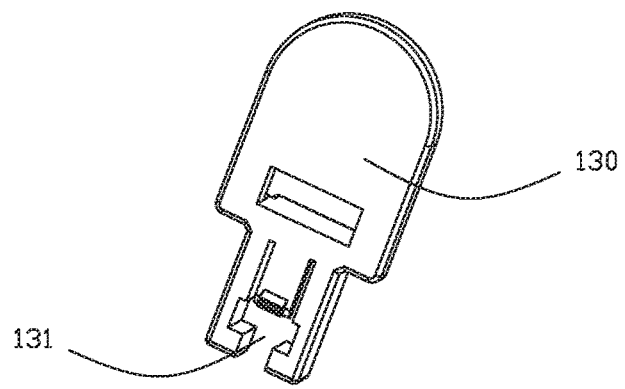
FIG. 9 illustrates a schematic diagram of the disassembly component of the present invention.

To achieve quick assembly and disassembly of the filtering dividing mechanism 110 of the present invention, the filtering dividing mechanism 110 is a straight insert shaped, when assembling, the filtering dividing mechanism 110 is inserted directly and pushed by hand. When disassembling, it only needs a disassembly tool to connect to the filtering dividing mechanism, the filtering dividing mechanism 110 is pulled out straightly by the disassembly tool to achieve disassembly. In this embodiment, the top portion of the inlet divider 112 is disposed with a lock block 1123, as figured in FIG. 8, when disassembling, a disassembly component 130 is locked to the lock block 1123, the disassembly component 123 is pulled to drive the filtering dividing mechanism 110 to separate from the inlet passage 101 of the inlet valve. The end portion of the disassembly component 130 is a lock groove 131 coupled to the lock block 1123, the lock groove 131 is locked to the lock block 1123 to achieve the connecting of the disassembly component 130 and the inlet divider 112. In detailed, as figured in FIG. 9, the disassembly component 130 is a wrench with a lock groove 131, the lock groove 131 is a reducing groove, the end portion of the lock block 1123 is an expanding head 1124, when connecting, the expanding head 1124 is inserted from the end face of the reducing groove to abut against the reducing groove.

Figure 10:
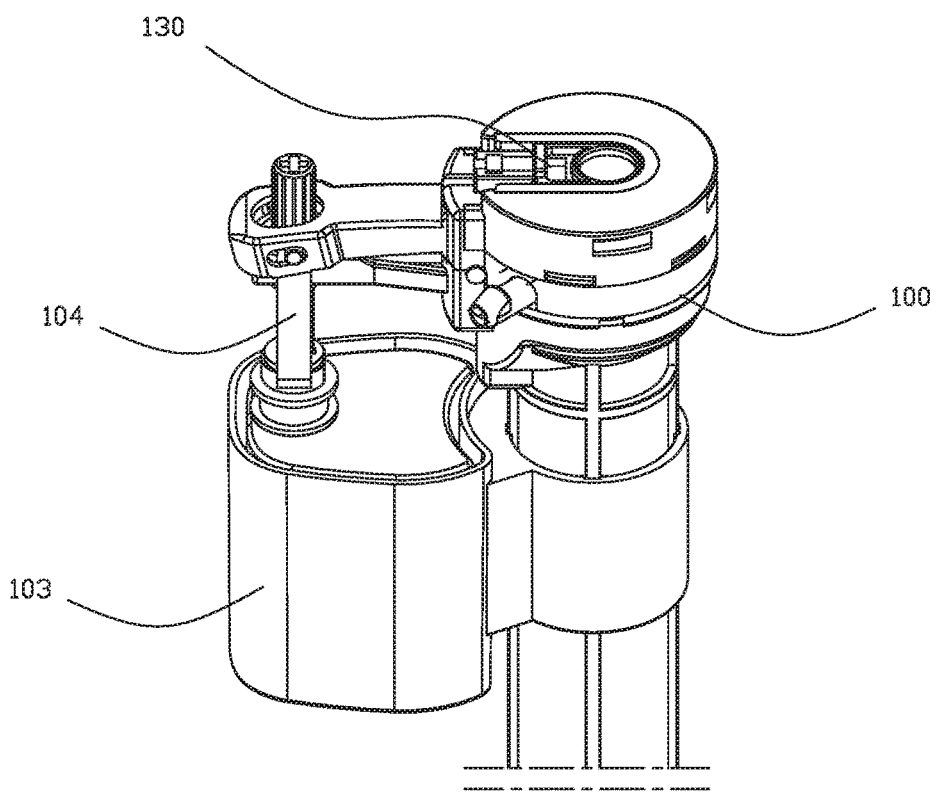
FIG. 10 illustrates a schematic diagram of the disassembly component and the inlet valve when assembling without the pipe body at the lower portion of the inlet valve.

In this embodiment, the disassembly tool can be a component of the inlet valve, that is to say, it is the disassembly tool of the filtering dividing mechanism 110 and also an accessory of the inlet valve 100. On one hand, to make it convenient to accept the disassembly component 130 and to catch to use, the upper position of the insert opening 102 is disposed with an insert groove 106 with one end opening, the disassembly component 130 slides from the opening of the insert groove 106 to be embedded to the insert groove 106 to finish the accepting; at the same time, the insert opening 102 is covered by the disassembly component 130 to prevent the filtering dividing mechanism 110 from separating from the insert opening 102, as figured in FIG. 10.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A water inlet valve providing stain resistance, easy cleaning, and quick disassembly, the water inlet valve comprising:
 an inlet passage having an insert opening disposed at an upper end of the water inlet valve;
 an inlet divider;
 a filter component connected to the inlet divider to form a filtering dividing mechanism, and
 a water stop valve in communication with the water inlet valve that that controls the water inlet valve to stop water flow;
 wherein the filter component and the inlet divider are disposed between the inlet passage and an outlet of the inlet valve,
 wherein water flowing through the inlet passage is filtered when flowing through the filter component and is divided into two waterways by the inlet divider including a main waterway that flows to the outlet for inletting and a sub-waterway that flows to the water stop valve, and
 wherein the filtering dividing mechanism is inserted into the inlet passage through the insert opening and is disassembled from the insert opening.

2. The water inlet valve according to claim 1, wherein the water stop valve comprises:
 a valve cover having an inlet groove and a decompression hole; and
 a water stop padding that covers the valve cover in a sealing way to form a water chamber with the valve cover,
 wherein the inlet groove is connected to the water chamber, the decompression hole is disposed on a bottom surface of the valve cover, the water chamber is connected to and an outside environment by the decompression hole, and water flowing through the sub waterway flows to the water chamber from the inlet groove and flows out of the decompression hole.

3. The water inlet valve according to claim 2, wherein the inlet valve has a plug, and a float connected to the plug by a link mechanism, so that, when water rises to a preset height within the inlet valve, the float drives the plug to close the decompression hole, and water pressure in the water chamber pushes the water stop padding to close the outlet.

4. The water inlet valve according to claim 1, wherein the inlet divider is disposed with a filter screen at an initial position of the sub-waterway, so that water flowing through the sub-waterway is filtered by the filter screen and flows to the water stop valve.

5. The water inlet valve according to claim 1, wherein the filter component totally covers an inlet of the inlet passage.

6. The water inlet valve according to claim 5, wherein the filter component is a column-shaped spiral filter screen that is inserted to an inlet end of the inlet divider.

7. The water inlet valve according to claim 1, wherein the inlet divider has a top portion that is disposed with a lock block so that, when disassembling, a disassembly component is locked to the lock block and, when pulled, the disassembly component drives the filtering dividing mechanism to separate from the inlet passage of the inlet valve.

8. The water inlet valve according to claim 7, wherein the disassembly component has an end portion that is a lock groove that couples to the lock block to lock the lock block and connect the disassembly component and the inlet divider.

9. The water inlet valve according to claim 8, wherein the disassembly component is a wrench with a lock groove that is a reducing groove having a face end, the end portion of the lock block has an expanding head so that, when connecting, the expanding head is inserted from the end face of the reducing groove to abut against the reducing groove.

10. The water inlet valve according to claim 9, wherein the insert opening has an upper position that is disposed with an insert groove with one end having an opening, wherein the disassembly component slides from the opening of the insert groove to be embedded within the insert groove, and wherein the insert opening is covered to prevent the filtering dividing mechanism from separating from the insert opening.

\* \* \* \* \*